United States Patent [19]
Kuo

[11] Patent Number: 5,884,680
[45] Date of Patent: Mar. 23, 1999

[54] COPYING CUTTING DEVICE FOR WOOD LATHES

[76] Inventor: Shun-Chi Kuo, No. 53, Chunjg-Cheng St., Hsin-She Hsiang, Taichung County, Taiwan

[21] Appl. No.: 834,281

[22] Filed: Apr. 15, 1997

[51] Int. Cl.⁶ .............................. B23B 3/28; B23Q 35/103
[52] U.S. Cl. ................................. 142/38; 82/11.1; 142/55
[58] Field of Search .................................. 142/1, 37, 38, 142/55, 7; 82/11, 11.1, 11.2, 17

[56] References Cited

U.S. PATENT DOCUMENTS

| | | | |
|---|---|---|---|
| 2,884,025 | 4/1959 | Fales, Jr. ..................................... | 142/55 |
| 3,332,458 | 7/1967 | Baldwin ..................................... | 142/38 |
| 3,405,745 | 10/1968 | Schoonover et al. ........................ | 142/7 |
| 4,256,155 | 3/1981 | Hochstatter et al. ....................... | 142/38 |

*Primary Examiner*—Steven C. Bishop
*Attorney, Agent, or Firm*—Rosenberg, Klein & Bilker

[57] ABSTRACT

A copying cutting device for wood lathes including two securing stems, two form securing devices each transversely mounted at the bottom end of each securing stem, a guide track device mounted above the securing stems, a cutter mounting device having a cutter mounted thereon screwably provided at the bottom side of the guide track device, and a form tracing device screwably disposed at the rear end of the cutter. The forms securing device positions a copy, and a tracing rod of the form tracing device urges against the tracing edge of the copy. The cutter slides in the cutter mounting device, which in turn slides in the guide track device. The cutter cuts the workpiece following the contour of the copy with the help of the tracing rod.

1 Claim, 6 Drawing Sheets

5,884,680

COPYING CUTTING DEVICE FOR WOOD LATHES

BACKGROUND OF THE INVENTION (a) Field of the Invention

The present invention relates generally to a copying lathe, and more particularly to copying cutting device for wood lathes, which enables mass processing of products to achieve consistent form and specification in an economical and speedy manner.

(b) Description of the Prior Art

Conventional wood lathes are usually not provided with copying cutting function. It depends upon the skill of the carpenter to cut, process and shape the products. Understandably, there are various drawbacks with them, which are listed below:

1. The worker has to be very skillful and experienced in order to produce satisfactory products. Ordinary workers are unable to do that, which means that prolonged training is necessary.
2. The products made by individual workers cannot be exactly identical in specification and form, so that quality is hard to control, and assembly is not easy. Besides, mass production is not possible.
3. It will be labor consumptive to try to manually produce products of identical form and specification. Faulty products may easily result, which will increase costs.

Although there is a kind of wood lathe which is equipped with a copying cutting device. The manufacturing cost is high and it can provide only a single cutting function, which is not economical.

SUMMARY OF THE INVENTION

Accordingly, a primary object of the present invention is to provide a copying cutting device which may be mounted on a wood lathe to provide it with copying cutting function. The device of the invention enables ordinary workers to easily produce products of identical specification and form in a speedy manner, thus enhancing production capacity, reducing work hours and faulty product rate, as well as costs. Besides, the specification and form of the products may be consistent, thus enhancing product quality and appearance.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
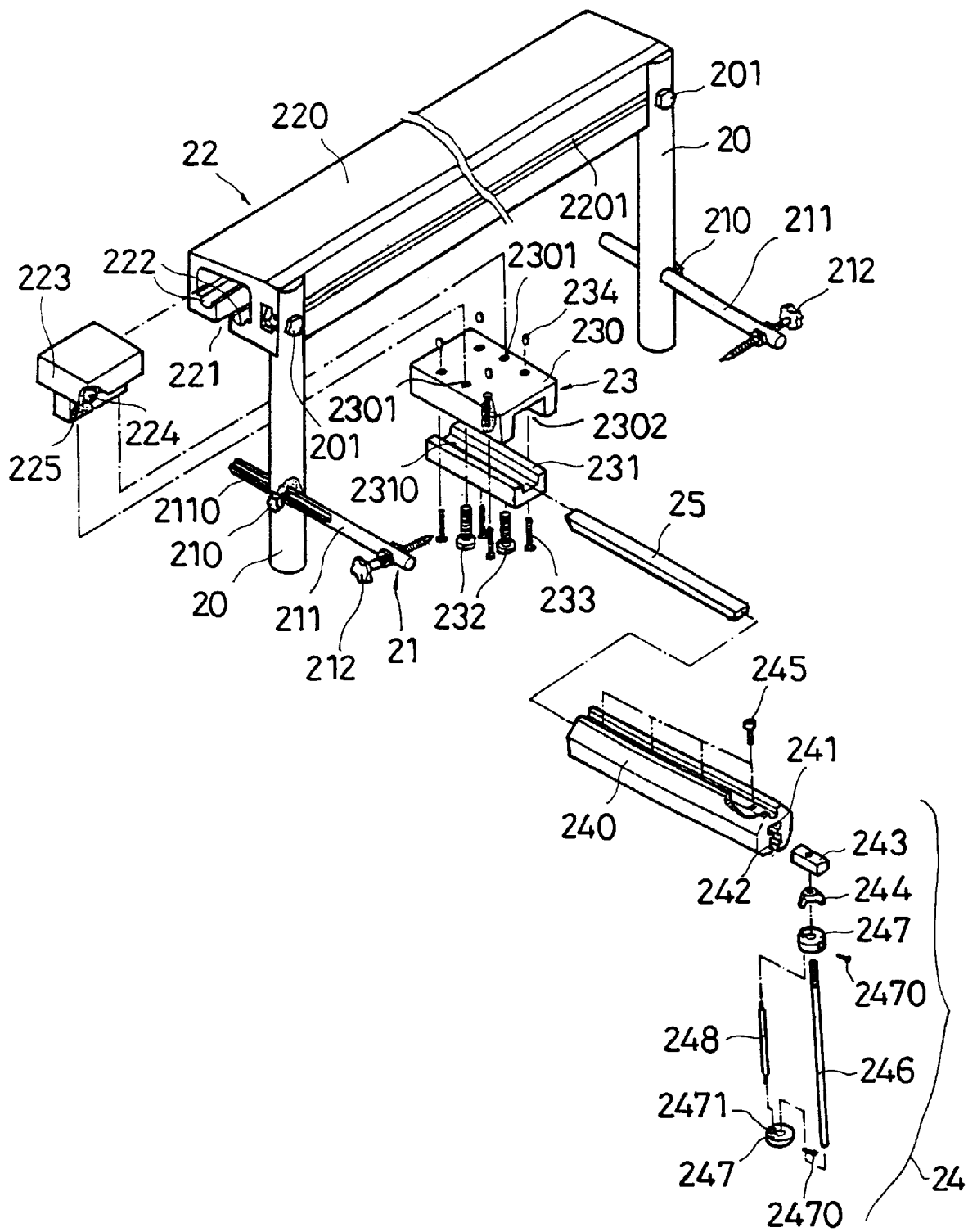
FIG. 1 is an elevational exploded view of the present invention.
Figure 2A:
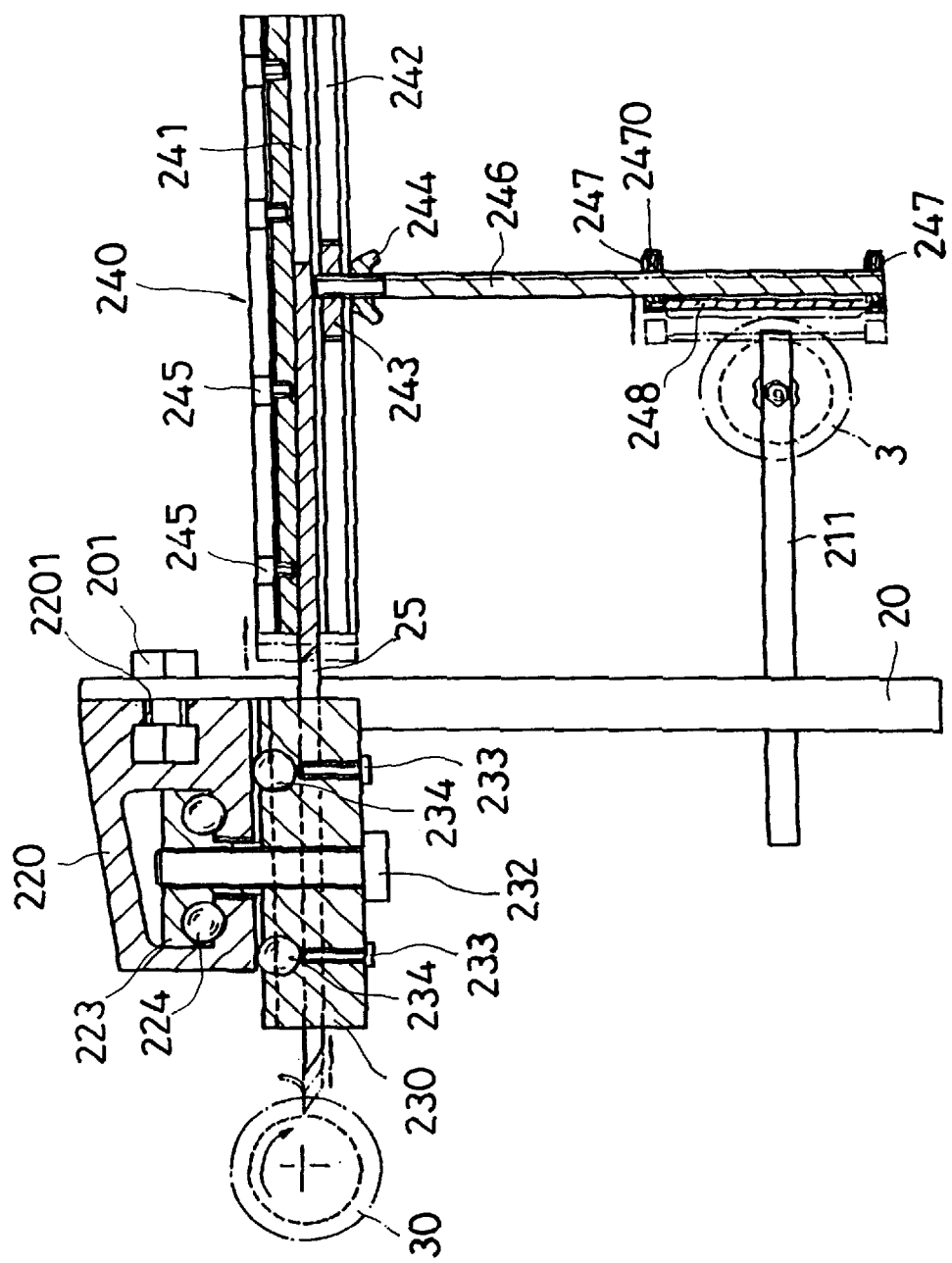
FIG. 2A is schematic sectional view of the present invention illustrating copying cutting.
Figure 2B:
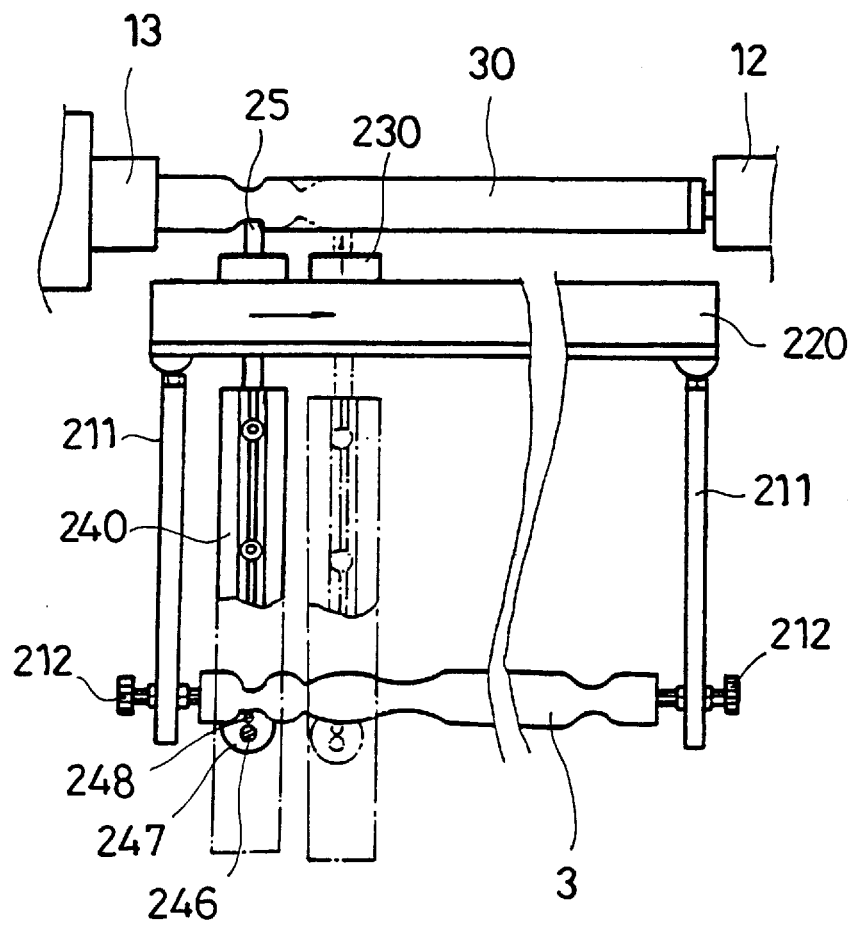
FIG. 2B is a schematic top view of the present invention illustrating copying cutting.

With reference to FIGS. 1 and 2, the present invention is comprised of two securing stems 20 each having a form securing device 21 inserting through a bottom end thereof. A guide track device 22 disposed above the securing rods 20 is screwably provided with a cutter mounting device 23 at a bottom portion thereof. The cutter mounting device 23 has mounted thereon a cutter 25 which is screwably provided with a form tracing device 24 at a rear end thereof.

The form securing devices 21 are each comprised of a horizontal rod having a positioning screw 212 passing through one end thereof, with the other end laterally provided with a positioning groove 2110. By means of a screw 210, the horizontal rod 211 is secured to the securing stem 20.

The guide track device 22 is comprised of a slide mount 220 laterally provided with a slide groove 2201. By means of a screw 201, the guide track device 22 is screwably locked with each securing stem 20 at either end. The guide track device 22 has a substantially T-shaped slide groove 221 therein. Either side of the slide groove 221 is provided with a ball holding groove 222. A substantially T-shaped slide block 223 is further provided. Either side of the slide block 223 is insertably provided with a ball 224. The bottom side is provided with a plurality of screw holes 225. The slide block 223 may just fit into the slide groove 221 such that the balls 224 may fit into the corresponding ball holding grooves 222.

The cutter mounting device 23 is comprised of a substantially inverted U-shaped upper mount 230 having a ball 224 insertably disposed at each of the four corners thereof. Each ball 234 is urged by a screw 233 at its bottom end. Two corresponding screw holes 2301 are provided on the upper side of the upper mount 230, while a recess 2302 is disposed at the bottom side. The recess 2302 receives a substantially U-shaped lower mount 231 provided with a cutter holding groove 2310. A plurality of screw bolts 232 are used to lock the cutter mounting device 23 to the screw holes 225 of the slide block 223.

The cutter 25 is fitted into the cutter holding groove 2310 of the cutter mounting device 23 such that it may slide therein.

The form tracing device 24 is comprised of a mounting seat 240 having therein a cutter channel 241 and a slide channel 242, which are arranged in a parallel relationship. The cutter channel 241 is fitted to an extreme end of the cutter 25 and is locked in position by means of a screw 245. A slide block 243 is fitted into the slide channel 242, and is coupled to a support rod 246 below. The support rod 246 is screwably provided with a nut 244 and has ferrules 247 fastened to the upper and lower ends thereof by screws 2470. Each ferrule 247 has a circular hole 2471. A tracing rod 248 having reducing ends is fitted into the circular hole 2471.

By means of the above-described structural elements, the securing stems 20 may be mounted on the wood lathe to work in cooperation with the form securing devices 21, which may screwably position the copy. The tracing rod 248 of the form tracing device 24 may urge against the tracing edge of the copy, while the cutter 25 is caused to slidably reciprocate in the cutter mounting device 23. The cutter mounting device 23 in turn slide left and right on the guide track device 22. In this way, the cutter 25 may accomplish copying cutting.

The operation and advantages of the present invention are described hereinbelow.

Figure 3:
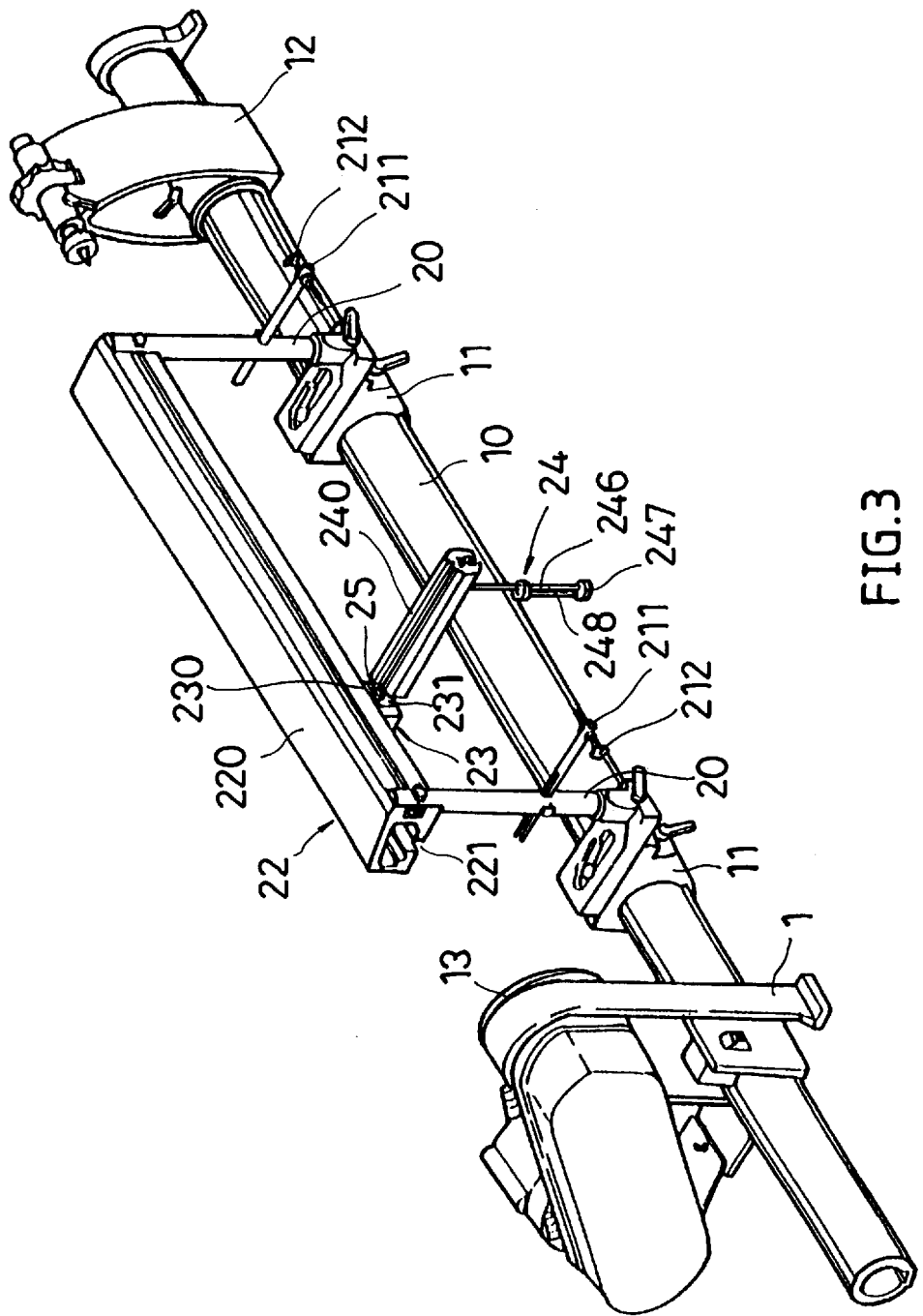
FIG. 3 is a schematic view showing the present invention assembled to a single track wood lathe.

With reference to FIGS. 2 and 3, when in use, the securing elements 11 provided on the guide track 10 of the lathe body 1 are adjusted to a suitable length depending on the length of the workpiece. Then, the distance between the two securing stems 20 is adjusted to match the set distance between the two securing elements 11 by loosening the screws 201 to enable slidable displacement of the securing stems 20 along the corresponding slide grooves 2201 laterally provided at the slide mount 220. In this manner, the copying device of the invention may be assembled to the lathe body 1. Then the workpiece 30 may be clamped in the chuck 13 and the tail stock 12 and positioned thereby, while the copy 3 is disposed on the form securing device 21 and is positioned by positioning screws 212. The size of the copy 3 may be slidably adjusted by means of the positioning groove 2110 on the horizontal rod 211. The cutter 25 is fitted into the cutter holding groove 2310 such that its blade abuts the workpiece 30. The rear end of the cutter 25 is fitted with the mounting seat 240 of the form tracing device 24 and is suitably positioned by means of the screw 245. The position of the support rod 246 is slidably adjusted by means of the slide block 243 in the slide channel 242, such that the tracing rod 248 may urge against the tracing edge of the copy 3. The nut 244 and the slide block 243 on the support rod 246 are set into position on the slide channel 242.

When the workpiece 30 held by the chuck 13 rotates, the cutter 25 will cut and process the workpiece 30. The worker may push the mounting seat 240 so that the cutter 25 slides along the cutter holding groove 2310 to cut the workpiece 30. Since the mounting seat 240 and the support rod 246 are screwably fastened as a whole, when the tracing rod 248 is pushed by the worker, it rests close against the tracing edge line of the form and restricts the cutter 25 to cutting a suitable depth of the workpiece, i.e., to a depth the same as that of the copy 3. Then, by applying forces on the cutter mounting device 23 from the left and right, the cutter mounting device 23 may slide to the left and to the right along the slide groove 221 by means of the balls 234 on the upper cutter mount 210 and the balls 224 on the T-shaped slide block 223. The tracing rod 248, on the other hand, moves up and down in curves along the contours of the copy 3. And by means of the circular holes 2471 in the ferrules 247, the tracing rod 248 may keep on rotating, achieving smooth tracing movements. Therefore, the cutter 25 may be caused to move in the same way as the tracing rod 248 to cut the workpiece 30 which will have the same contour as the copy 3.

As it can be seen from the above, the present invention has the following advantages:
1. Ordinary workers may easily achieve copying cutting to obtain products of the same specification and form. Training is not necessary.
2. The specification and form of the processed products are consistent. Quality is ensured.
3. The copying cutting device enables speedy processing of workpieces to achieve consistent specification and form, which effectively reduces labor, raised capacity, reduces faulty products, and lower costs.
4. The present invention is easy to manufacture and assemble, and may be adapted for use in all kinds of wood lathes.

Figure 4:
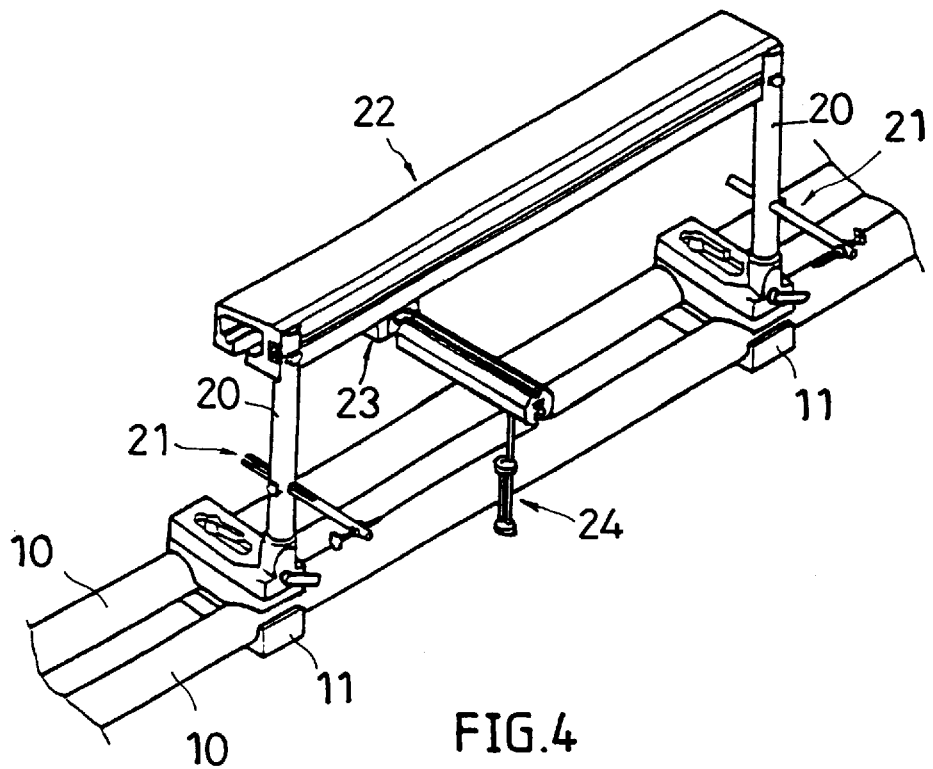
FIG. 4 is a schematic view showing the present invention assembled to a double track wood lathe.
Figure 5:
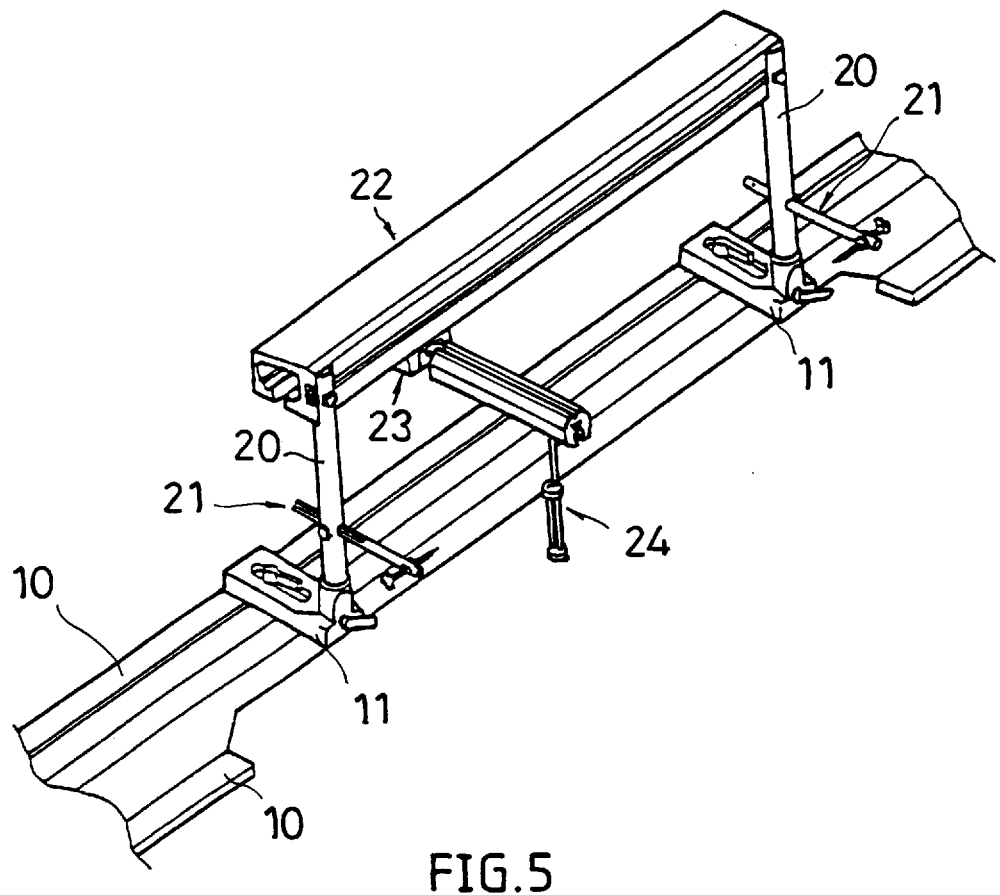
FIG. 5 is a schematic view showing the present invention assembled to a bench lathe.

Furthermore, with reference to FIGS. 3, 4, and 5, the present invention may be adapted for use in single track, double track, and bench type wood lathes to achieve copying cutting.

Figure 6:
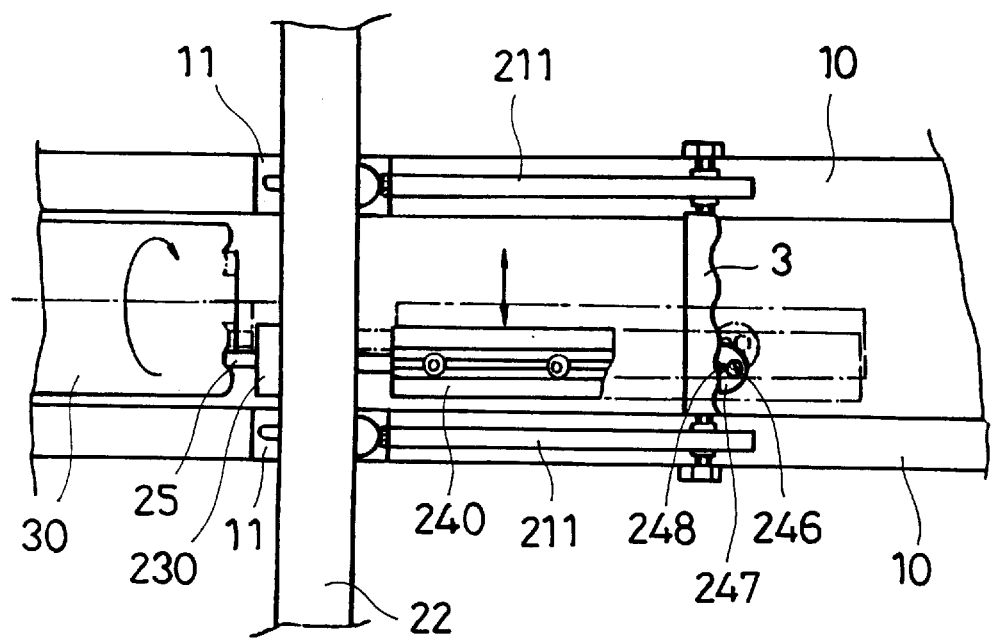
FIG. 6 is another example of use of the present invention.

Referring further to FIG. 6, which shows an example of applying the present invention, the securing stems 20 may be transversely mounted on the securing elements 11 of two parallel, juxtaposed guide tracks 10, and the cutter 25 is perpendicular to the end surface of the workpiece 30. By means of this arrangement, copying cutting may be done to the end surface of the workpiece 30 or the surface of a disk-like object, which is not possible with conventional wood lathes.

In summary, the present invention provides a copying cutting device for wood lathes to enable mass processing of workpieces to achieve consistent form and specification.

Although the present invention has been illustrated and described with reference to the preferred embodiment thereof, it should be understood that it is in no way limited to the details of such embodiment but is capable of numerous modifications within the scope of the appended claims.

What is claimed is:

1. A copying cutting device for wood lathes, comprising two securing stems, two form securing devices each passing through a lower portion of the corresponding securing stem, a guide track device mounted above said securing stems, said guide track device being screwably provided with a cutter mounting device at a bottom side thereof, said cutter mounting device having a cutter mounted thereon, said cutter having a form tracing device screwably provided at a rear end thereof; wherein said form securing devices are each comprised of a horizontal rod having a positioning screw passing through one end thereof, with the other end laterally provided with a positioning groove, said horizontal rod being screwably positioned on said securing stem;

said guide track device is comprised of a slide mount laterally provided with a slide groove and is screwably locked with each of said securing stems at either end, said guide track device having a substantially T-shaped slide groove therein, with a ball holding groove disposed at either side thereof; said guide track device further comprising a substantially T-shaped slide block which is insertably provided with a ball at either side, and a plurality of screw holes at a bottom side thereof, said slide block just fitting into said T-shaped slide groove such that said balls thereof may fit into the corresponding ball holding grooves;

said cutter mounting device is comprised of a substantially inverted U-shaped upper mount having a ball insertably disposed at each of the four corners thereof, each ball being urged by a screw at its bottom end, two corresponding screw holes being provided on an upper side of said upper mount while a recess is disposed at a bottom side thereof, said recess being provided for receiving a substantially U-shaped lower mount provided with a cutter holding groove, said cutter mounting device being screwably locked to said screw holes of said T-shaped slide block;

said cutter is fitted into said cutter holding groove of said cutter mounting device such that it may slide therein; and said form tracing device is comprised of a mounting seat having therein a cutter channel and a slide channel, which are arranged in a parallel relationship, said cutter channel being fitted to an extreme end of said cutter and being screwably locked in position, a slide block being fitted into said slide channel and coupled to a support rod below, said support rod being provided with a nut and having ferrules screwably fastened to the upper and lower ends thereof, each of said ferrules having a circular hole into which a tracing rod having reducing ends may be fitted; whereby said copying cutting device may be mounted on a wood lathe, while a copy is positioned by said form securing device, said tracing rod of said form tracing device being arranged to urge against a tracing edge of the copy and said cutter being caused to slide in said cutter mounting device, which in turn slide in said guide track device, said cutter cutting a workpiece following the contour of the copy.

* * * * *